United States Patent
Chen

(10) Patent No.: US 6,857,079 B2
(45) Date of Patent: Feb. 15, 2005

(54) INTEGRATED DRIVER ELECTRONIC (IDE) DEVICE POWER CONTROL

(75) Inventor: Rong-Dyi Chen, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 622 days.

(21) Appl. No.: 09/785,927

(22) Filed: Feb. 16, 2001

(65) Prior Publication Data

US 2002/0116652 A1 Aug. 22, 2002

(51) Int. Cl.[7] .............................................. G06F 1/26
(52) U.S. Cl. ....................... 713/324; 713/321; 713/323; 327/108; 327/365
(58) Field of Search ................................. 713/300, 310, 713/320, 322, 323, 324, 330; 327/100, 108, 278, 281, 365, 376, 377, 389; 710/15; 714/24

(56) References Cited

U.S. PATENT DOCUMENTS

| | | | | |
|---|---|---|---|---|
| 5,535,400 A | * | 7/1996 | Belmont | 713/330 |
| 5,675,810 A | * | 10/1997 | Sellers | 713/323 |
| 5,783,962 A | * | 7/1998 | Rieger | 327/390 |
| 6,107,854 A | * | 8/2000 | Wong et al. | 327/281 |
| 6,307,409 B1 | * | 10/2001 | Wrathall | 327/112 |
| 6,373,296 B1 | * | 4/2002 | Auer et al. | 327/108 |
| 6,389,556 B1 | * | 5/2002 | Qureshi | 714/15 |
| 6,516,374 B1 | * | 2/2003 | Kinoshita et al. | 710/304 |
| 6,618,813 B1 | * | 9/2003 | Hsu et al. | 713/323 |

* cited by examiner

Primary Examiner—Lynne H. Browne
Assistant Examiner—Thuan Du
(74) Attorney, Agent, or Firm—Meyertons Hood Kivlin Kowert & Goetzel, P.C.; B. Noël Kivlin

(57) ABSTRACT

Methods and apparatus for power managing IDE devices. A driver is coupled to a switch, the driver receiving a control signal from a computer system, the control signal indicating whether the computer system is in a power-save mode. The driver drives the switch which generates an output control signal to an IDE device. When the operating system detects that the computer system has been idle for a certain period of time, the operating system toggles the control signal that feeds into the driver which shuts off the switch so that power feeding to the IDE device is shut off.

20 Claims, 5 Drawing Sheets

INTEGRATED DRIVER ELECTRONIC (IDE) DEVICE POWER CONTROL

FIELD OF THE INVENTION

This invention relates to computer systems, more specifically, to controlling power consumption of an integrated drive electronics (IDE) device.

Sun, Sun Microsystems, Sun Ray, Sun logo, Java, and all Java-based trademarks and logos are trademarks or registered trademarks of Sun Microsystems, Inc. in the United States an other countries. All SPARC trademarks are used under license and are trademarks of SPARC International, Inc. in the United States and other countries. Products bearing SPARC trademarks are based upon an architecture developed by Sun Microsystems, Inc.

BACKGROUND OF THE INVENTION

Power management is desirable for desktop personal computers and workstations because a typical desktop computer system can consume several hundred watts of power per hour when it is turned on, whether or not it is being used. This energy consumption can be quite expensive, particularly in the context of large companies and other institutions that may have hundreds or even thousands of desktop computer systems turned on both day and night. One way to reduce power consumption is to power manage the computer system by, for example, turning off peripheral devices that are not in use or slow down the processes that are running on the computer.

Energy Star (EStar) guidelines are power management guidelines issued by the U.S. Government's Environmental Protection Agency (EPA). EStar guidelines exist for many products, including desktop computers. EStar power management guidelines require specified reduction in power within a specified time for a computer system when no keyboard or mouse activity has been detected.

As stated above, reduction in power consumption of peripheral devices is one way to improve power saving. Integrated drive electronics (IDE) is a type of hardware interface widely used to connect peripherals such as hard disks, CD-ROMs and tape drives to a desktop computer. Typically, two Enhanced IDE (EIDE) sockets are built onto the motherboard, and each socket connects to two peripheral devices via a 40-pin ribbon cable. Since peripheral devices are connected via the IDE, it is useful to control power to the peripheral devices via the IDE.

SUMMARY OF THE INVENTION

The invention relates to methods and apparatus for power managing a computer system by controlling power to integrated driver electronics (IDE) devices. In accordance with the invention, a transistor in a power control circuit controls power flow to the IDE devices.

In one embodiment, a control signal informs the power control circuit that a computer system is entering power management state. The power control circuit may be coupled between the computer system and the IDE interface. The power control circuit includes a driver coupled to a switch. The control signal controls the driver which drives the switch. For example, when the control signal is high (e.g., indicating power management state), the driver turns off the switch so that power is cut off from the IDE channel the switch is coupled to. When the control signal is low (e.g., indicating normal operating state), the driver turns on the switch so that the IDE device receives power.

In one embodiment, where multiple IDE channels are available, the switches may provide different power levels to operate IDE devices requiring different operating voltages. In one embodiment, the driver is a power metal oxide semiconductor field effect transistor (MOSFET) driver. In one embodiment, the switch is a MOSFET.

This summary is not intended to limit the scope of the invention, which is defined solely by the claims attached hereto.

While specific embodiments are described and illustrated herein, these embodiments are not intended to limit the scope of the invention, which is susceptible to various modifications and alternative forms.

DETAILED DESCRIPTION OF THE INVENTION

Methods and apparatus for controlling power usage of an integrated driver electronic (IDE) device are provided. In accordance with the present invention, field effect transistors (FETs) control power supplied to IDE devices.

Figure 1:
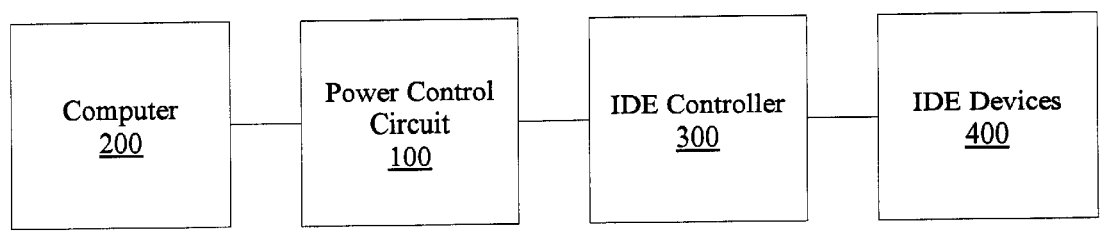
FIG. 1 is a block diagram of a computer system in accordance with one embodiment of the present invention.

FIG. 1 shows a block diagram of a computer system employing a power control circuit. Power control circuit 100 is coupled between a computer 200 and an IDE controller 300 which has a plurality of IDE devices 400 coupled thereto. Each block is described in detail below.

Figure 2:
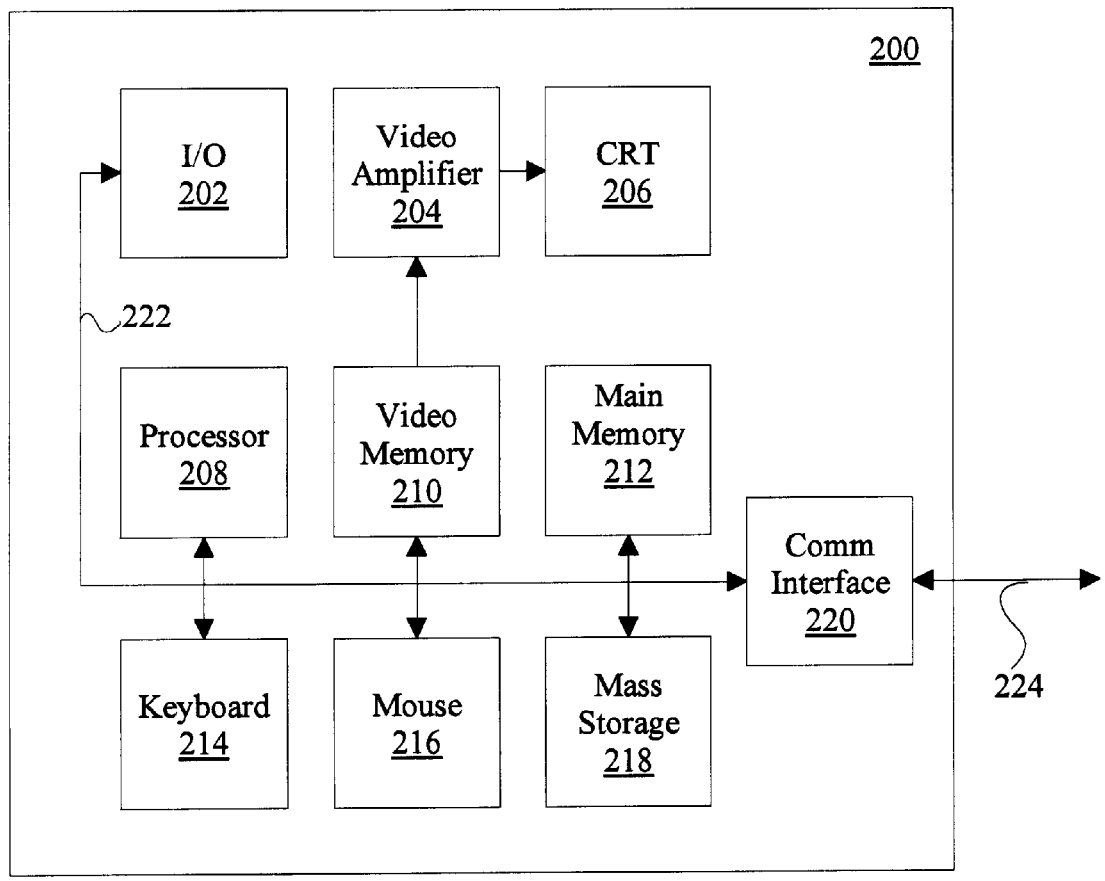
FIG. 2 is a block diagram of a general purpose computer.

Computer 200 may be any suitable computers such as a personal computer or a workstation. FIG. 2 shows an example of a general purpose computer that may be used. A keyboard 214 and a mouse 216 are coupled to a bi-directional system bus 222. Keyboard 214 and mouse 216 introduce user input to computer 200 and communicate user input to a processor 208. Other suitable input devices may be used in addition to, or in place of, keyboard 214 and/or mouse 216. Input/output (I/O) unit 202 coupled to bi-directional system bus 222 represents I/O elements such as a printer, audio/video (A/V) I/Os, etc.

Bi-directional system bus 222 may contain, for example, thirty-two address lines for addressing a video memory 210 or a main memory 212. System bus 222 may also includes, for example, a 32-bit data bus for transferring data between and among components, e.g., processor 208, video memory 210, main memory 212 and mass storage 218, all coupled to bus 222. Alternatively, multiplex data/address lines may be used instead of separate data and address lines.

Processor 208 may be a microprocessor manufactured by Motorola (e.g., 680X0 processor), a microprocessor manufactured by Intel (e.g., 80X86 or Pentium processor) or a SPARC microprocessor from Sun Microsystems, Inc. Other suitable microprocessor or microcomputer may be utilized.

Main memory 212 may comprise dynamic random access memory (DRAM) or other suitable memories. Video memory 210 may be a dual-ported video random access memory. For example, one port of video memory 210 may be coupled to a video amplifier 204 which is used to drive a monitor 206. Monitor 206 may be a cathode ray tube (CRT) raster monitor, a liquid crystal display (LCD), or other suitable monitors for displaying graphic images. Video amplifier 204 is well known in the art and may be implemented by any suitable apparatus. In one embodiment, pixel data stored in video memory 210 is converted to a raster signal suitable for use by monitor 206. Mass storage 218 may include both fixed and removable media, such as magnetic, optical or magnetic optical storage systems or any other available mass storage technology.

Computer 200 may include a communication interface 220 coupled to bi-directional system bus 222. Communication interface 220 provides a two-way data communication via a network link 224 to a local network. In the case of an integrated service digital network (ISDN) card or a modem, communication interface 220 provides a data communication connection to the corresponding type of telephone line, which comprises part of network link 224. If communication interface 220 is a local area network, (LAN) card, communication interface 220 provides a data communication connection via network link 224 to a compatible LAN. Wireless links are also possible. In any such implementation, communication interface 220 sends and receives electrical, electromagnetic or optical signals which carry digital data streams representing various types of information.

Network link 224 typically provides data communication through one or more networks to other data devices. For example, network link 224 may provide a connection through local network to a host computer or to data equipment operated by an Internet Service Provider (ISP). ISP in turn may provide data communication services through the world wide packet data communication network commonly referred to as the "internet." Local network and internet both use electrical, electromagnetic or optical signals which carry digital data streams. The signals through the various networks and the signals on network link 224 and through communication interface 220, which carry the digital data to and from computer 200, are exemplary forms of carrier waves transporting the information. Computer 200 can send messages and receive data, including program code, through these communication channels.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

IDE controller 300 (FIG. 1) may be built into the drive of computer 200. For example, two enhanced IDE (EIDE) sockets may be built onto the motherboard of computer 200, each socket connects to two IDE devices via a 40-pin ribbon cable. In one embodiment, each socket (channel) of IDE controller 300 may operate at DMA mode 4 speed independently from each other. In one embodiment, the channels may support ultra 66 high performance ATA bus for 66 Mbytes transfer rate. In one embodiment, the channels may support concurrent operation. In general, any suitable IDE controller may be used.

IDE devices 400 may be any devices that are compatible with the IDE controller 104. Some examples of IDE devices are hard disks, CD-ROMs and tape drives among others.

Figure 3:
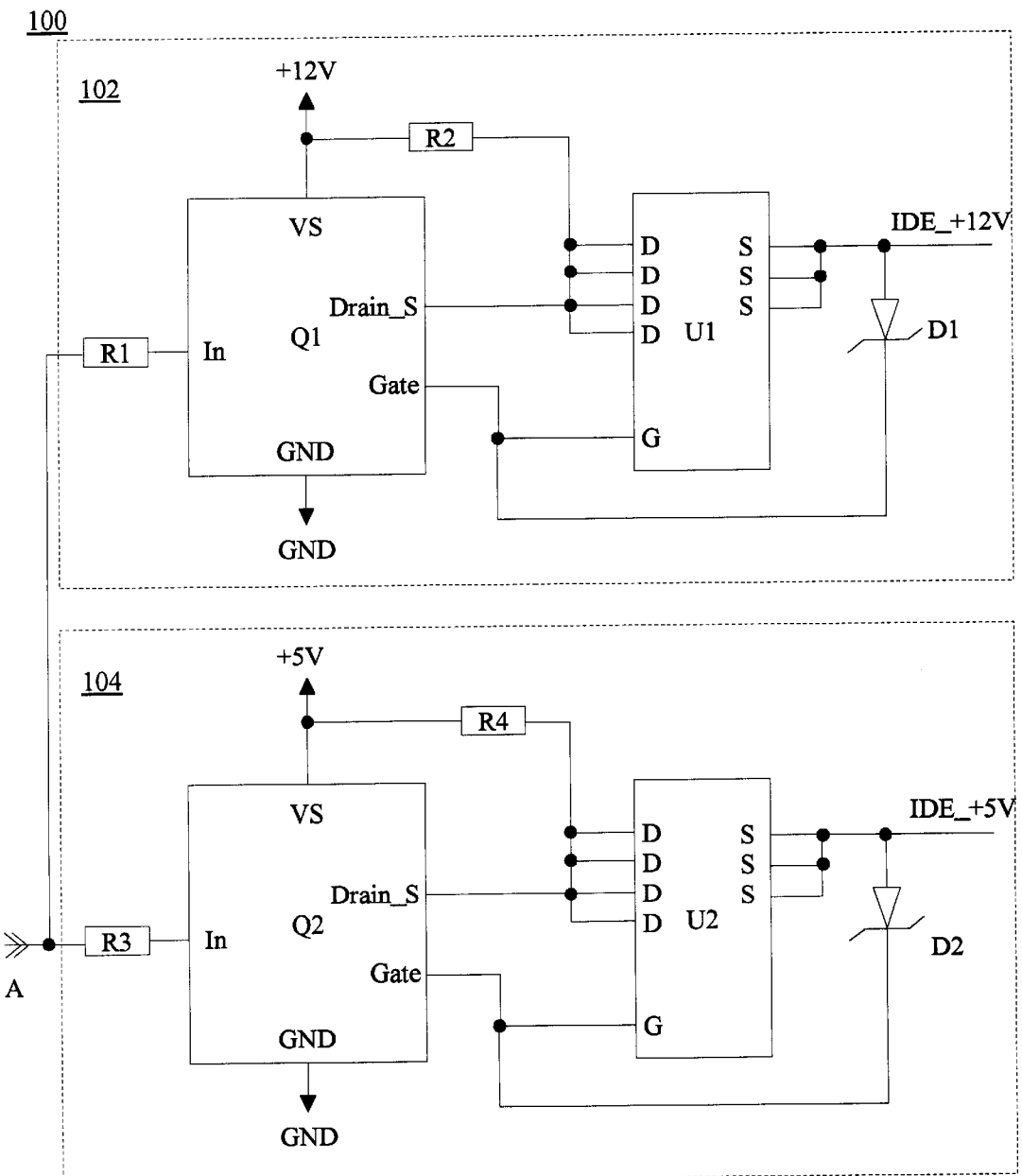
FIG. 3 is a power control circuit in accordance with one embodiment of the present invention.

FIG. 3 shows a power control circuit 100 in detail in accordance with one embodiment of the present invention. Power control circuit 100 includes two similar branches 102 and 104 coupled in parallel. Both branches 102 and 104 are controlled by a control signal A that informs power control circuit 100 whether the computer system is going into the power management mode, e.g., after the system has been idling for a predetermined time. Control signal A may be a software controllable signal generated by computer 200 (FIG. 1) and provided to power control circuit 100 through, e.g., a general purpose input/output (GPIO) pin. In one embodiment, control signal A is supplied by a GPIO pin from an integrated system I/O chipset such as an ALi M1535D South Bridge from Acer Labs. Control signal A may be a transistor transistor logic (TTL) or complimentary metal-oxide semiconductor (CMOS) compatible signal.

In one embodiment, when disk activity of computer 200 (FIG. 1) has been idle for a predetermined time of, e.g., 30 minutes, a software driver puts the computer drive into a low power state. The low power state may be defined as, for example, the motor is stopped; the actuator is parked; and all electronics except the interface control are in a low power state. Computer 200 may also toggles control signal A to the power control circuit 100 to further reduce power consumptions of the system by cutting off power to IDE devices 400 (e.g., hard drive and CD ROM drive) coupled to IDE controller 300. The system may leave the low power state upon receipt of a command that requires disk access or upon receiving a spinup command from e.g., software. At that time, computer 200 may toggle control signal A to resume delivery of power to the IDE devices 400.

Branch 102 of power control circuit 100 includes a metal oxide semiconductor field effect transistor (MOSFET) driver Q1 coupled to a MOSFET U1. Control signal A feeds into input terminal In of MOSFET driver Q1 through a serial damping resistor R1. Serial damping resistor R1 damps out possible ringing on the control signal A, thus preventing the circuit from falsely turning on or off. Resistor R1 may have a resistance value between approximately 10 ohm and approximately 100 ohm. In one embodiment, input terminal In is active high and activates MOSFET U1 when MOSFET driver Q1 is switched ON.

In one embodiment, MOSFET driver Q1 is a power MOSFET driver of N-channel enhancement-type. MOSFET driver Q1 preferably has extremely low off-state supply current so that power consumption during an off state is close to zero. In one embodiment, MOSFET driver Q1 may be a high-side micropower MOSFET driver such as LTC1154 from Linear Technology. It is noted that in high-side configurations, the source voltage of the MOSFET approaches the supply voltage when switched on. To keep the MOSFET from turning on, the driver's output may drive the MOSFET gate voltage higher than the supply voltage. In a typical high-side configuration, the driver is powered from the load supply voltage. In general, any suitable MOSFET driver may be used.

MOSFET driver Q1 may have an internal charge pump (not shown) that boosts the gate drive voltage higher than the driver supply voltage so that the gate voltage may be sustained. This internal charge pump may enhance the N-channel switch with no external components.

In one embodiment, MOSFET driver Q1 may include over-current sensing to prevent over-current. A time delay may be added to prevent false triggering on high in-rush current loads. In one embodiment, an internal zener diode (not shown) may be used to limit the gate-to-source voltage to a safe level for standard N-channel MOSFETs. It is noted that the internal charge pump and the over-current sensing circuitry may be activated when MOSFET driver Q1 is switched ON.

Power supply terminal VS of MOSFET driver Q1 is coupled to a power supply. In one embodiment, the power supply may be a 12-volt power supply, but may be any power supply with appropriate power levels. Supply terminal VS powers the input, gate drive, regulation, protection and other circuitry. Under typical operation, MOSFET driver Q1 is continuously powered so that the gate of the MOSFET is actively driven at all times. Ground terminal GND of MOSFET driver Q1 is coupled to ground (e.g., 0 volt).

Drain sense terminal Drain_S of MOSFET driver Q1 is coupled to a drain D of MOSFET U1. Drain sense terminal Drain_S of MOSFET driver Q1 senses the current flowing into drain D of power MOSFET U1 in a high-side application. Gate drive terminal Gate of MOSFET driver Q1 is coupled to a gate G of MOSFET U1. Drain D is also coupled to the power supply through a current-limiting resistor R2. Current-limiting resistor R2 provides over-current protection. The value of current-limiting resistor R2 depends on the maximum current that may be drawn from the circuit.

MOSFET driver Q1 constantly monitors the voltage difference between Drain_Sense pin and source pin, i.e., the voltage drop on resistor R2. If the voltage drop exceeds, e.g., 100 mV, the MOSFET gate quickly discharges. Thus, resistor R2's value selection depends on the maximum current that may be drawn from the circuit, for example, I×R2=100 mV.

Gate drive terminal Gate is typically either driven to ground when the switch is turned OFF or driven above the supply voltage when the switch is turned ON. Gate Drive terminal Gate acts as a relatively high impedance when driven above the supply voltage (e.g., the equivalent of a few hundred k$\Omega$). The drain sense terminal voltage is compared against the supply terminal voltage. If the voltage at the drain sense terminal Drain_S is more than 100 mV below the voltage at the supply terminal VS, the input latch is reset and the MOSFET gate is quickly discharged.

MOSFET U1 may be a single N-channel logic level PowerTrench® MOSFET by Fairchild Semiconductor™. In general, MOSFETs with low in-line power loss and fast switching may be employed. Output signal from source S of MOSFET U1 drives the IDE devices. Diode D1 coupled between source S and gate G of MOSFET U1 and gate drive terminal Gate of MOSFET driver Q1 prevent current from feeding back into the MOSFETs Q1 and U1. Diode D1 may be a Schottky diode for fast-switching.

Branch 104 of power control circuit 100 is substantially similar to branch 102 described above. Specifically, control signal A feeds into MOSFET driver Q2 through a current limiting resistor R3. MOSFET driver Q2 is coupled to a MOSFET U2. Both MOSFET driver Q2 and MOSFET U2 are powered by a power source. The power source may have a different power level than branch 102, e.g., 5-volt power supply. Output terminal of MOSFET U2 is coupled to a diode D2 to prevent current backflow.

Figure 4:
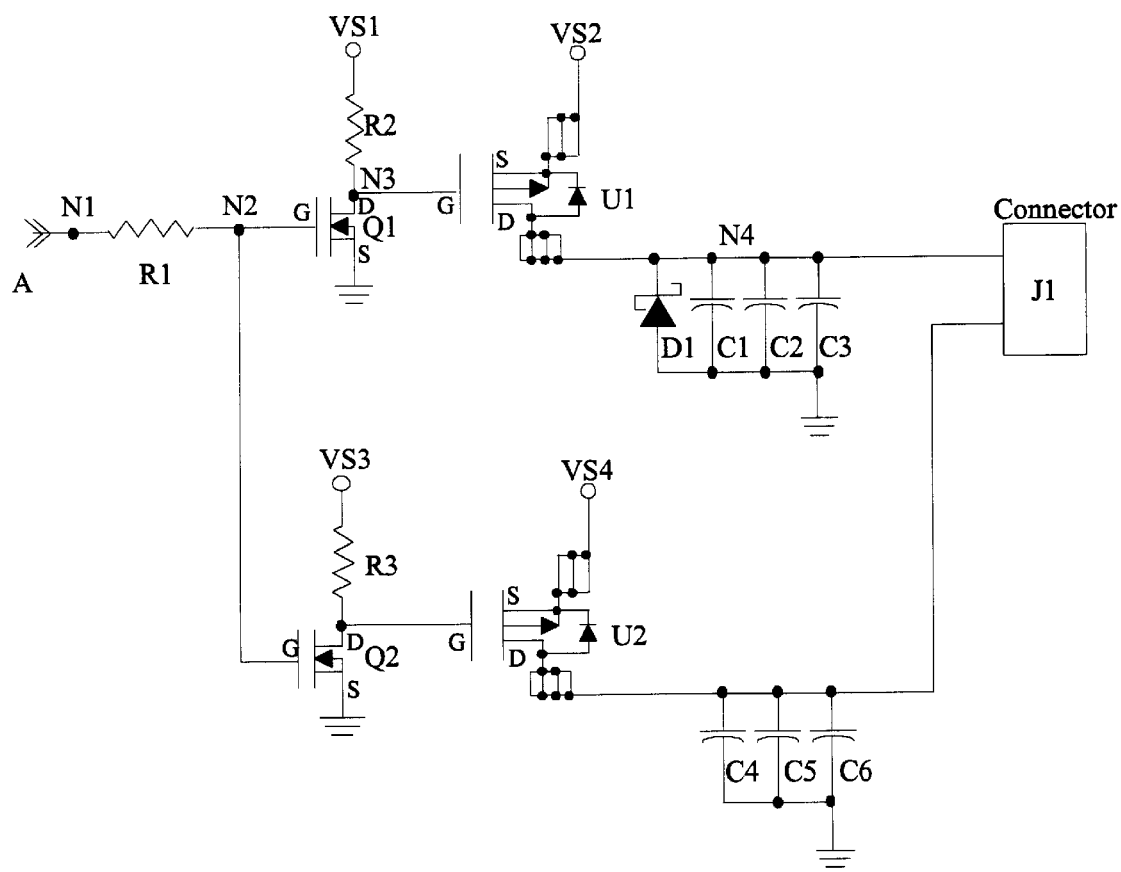
FIG. 4 is a power control circuit in accordance with one embodiment of the present invention.

FIG. 4 shows a power control circuit in one embodiment of the present invention. Control signal A enters node N1 which is coupled to a first terminal of a damping resistor resistor R1. Resistor R1 may be a resistor having appropriate value. Gate of field effect transistor (FET) Q1 is coupled to a second terminal of resistor R1 at node N2. Drain of FET Q1 is coupled to a power source VS1 through a resistor R2 at node N3. Source of FET Q1 is coupled to ground. FET Q1 should have low resistance and low power dissipation. In general, FET Q1 may be any suitable field effect transistors or equivalent devices for switching applications. FET Q1 may be a digital FET such as an N-channel logic level enhancement mode field effect transistor manufactured by, e.g., Fairchild Semiconductor™. In one embodiment, double diffused metal oxide semiconductor (DMOS) technology may be used. The DMOS manufacturing process produces a very thin channel area which provides very low levels of ON resistance (typically 270 mW per mm$^2$), making it a good choice for switching applications. The low resistance also results in reduction of power dissipation.

Drain of FET Q1 is also coupled to a MOSFET U1. MOSFET U1 may be a P-channel logic level PowerTrench® MOSFET manufactured by, e.g., Fairchild Semiconductor™. MOSFET U1 acts as a switch, managing power to the IDE devices. Source of MOSFET U1 is coupled to a voltage source, e.g., 12 volts. Drain of MOSFET U1 is coupled to a diode D1 and three capacitors at node N4. Diode D1 and the three capacitors C1, C2 and C3 are coupled in parallel between drain of MOSFET U1 and ground. Capacitors C1 and C2 may be 22UF/16V capacitors and capacitor C3 may be a 1UF capacitor. Diode D1 may be a Schottky diode which has small voltage drop and thus can improve system efficiency. Schottky diode D1 is also used for its fast switching speed, typically, within 3 nano seconds. Capacitors C1, C2 and C3 serve as decoupling and filtering capacitors for, e.g., +12V. Diode D1 provides surge protection to protect the power MOSFET for, e.g., +12V. Node N4 is coupled to, for example, a hard disk power connector.

Additional circuit may be added to control power to additional IDE devices or IDE devices requiring different power levels. For example, control signal A may also feed into a FET Q2 which is powered by, e.g., a 5-volt power supply, through resistor R1. FET Q2 is coupled to a MOSFET U2 which is also powered by, e.g., a 5-volt power supply. MOSFET U2 is coupled to one or more capacitors (e.g., C4, C5 and C6 in parallel) and a connector J1. Capacitors C4, C5 and C6 serve as decoupling and filtering capacitors for, e.g., +5V. A diode may be provided to provide surge protection for the +5V circuit, similar to that described for diode D1.

Connector J1 may be coupled to various IDE controllers (not shown). Each IDE controller may include multiple channels to support multiple IDE devices. The IDE devices may be, but are not limited to, an Ultra DMA/99 capable hard drive and a DVD CD-ROM.

Figure 5:
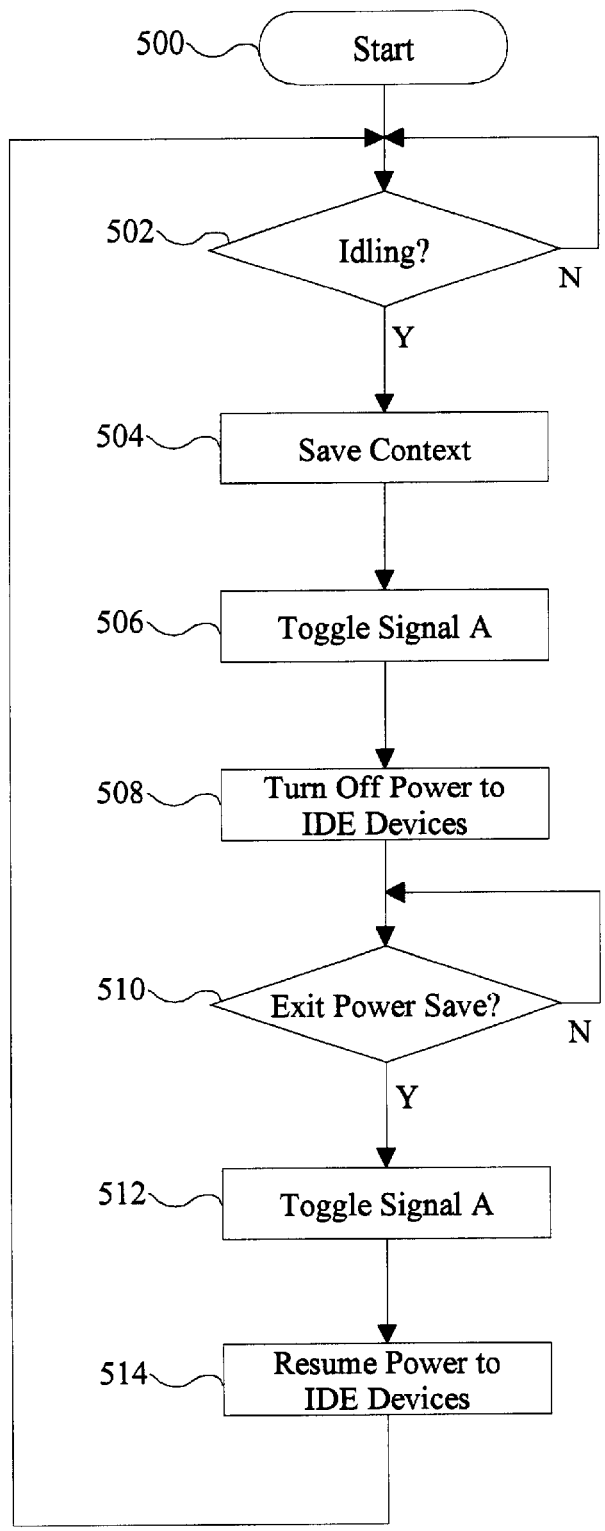
FIG. 5 is a flow chart depicting the power control sequence in accordance with one embodiment of the present invention.

FIG. 5 shows a flow chart illustrating an embodiment of the power control scheme. The process starts in step 500. The operating system (OS) of a computer system determines whether the computer system has been idle for a certain period of time in step 502. Idling may be when no external operations, such as mouse and keyboard movements, have been detected by the system for a predetermined amount of time, e.g., 30 minutes. If the system has not been idle for the predetermined time, the computer system continues normal operation, such as providing full power to the IDE devices coupled to the computer system. The operating system continues to check for idleness. If the system has been idle for the predetermined time, the operating system saves the context (e.g., the current state, status, mode or condition of the system) of the computer system to memory (e.g., hard drive) so that the system can resume after normal operation resumes, in step 504. The operating system then toggles control signal A to shut off power that is feeding the IDE devices in step 506. The system enters into a low power state and turns off the power to the IDE devices in step 508.

During the power save state, the operating system continues to monitor for commands or signals to exit the power save state, for example, if a user moves the mouse or types on the keyboard, in step 510. If no signal is received to exit power save state, the operating system continues to check for the signal until such signal is received, at which time the operating system toggles signal A in step 512. Signal A now activates the power control circuit so that it resumes power delivery to IDE devices in step 514. The computer system resumes normal operation. The operating system again checks to see if the system needs to enter the power save state.

The above process may be implemented in part by computer software in the form of computer readable code executed on a general purpose computer, in the form of bytecode class files executable within a Java™ runtime environment running on such a computer, or in the form of bytecodes running on a processor (or devices enabled to process bytecodes) existing in a distributed environment (e.g., one or more processor on a network). In general, any suitable computer system and programming/processing environment may be used.

While the present invention has been described with reference to particular figures and embodiments, it should be understood that the description is for illustration only and should not be taken as limiting the scope of the invention. Many changes and modifications may be made to the invention, by one having ordinary skill in the art, without departing from the scope of the invention.

What is claimed is:

1. A system for controlling power usage of an integrated driver electronics (IDE) device, comprising:
   a first power supply for supplying power at a first voltage;
   a first switch for receiving power supplied from said first power supply at said first voltage;
   an input terminal for receiving a control signal;
   a first damping resistor serially connected to said input terminal, said first damping resistor damping out any possible ringing on said control signal from said input terminal to prevent a false signaling effect;
   a first hardwired driver coupled to said first damping resistor and said first switch;
   a first IDE device coupled to said first power supply via said first switch;
   wherein said first hardwired driver receives said control signal from said first damping resistor and drives said first switch to power said first IDE device via said first power.

2. The system of claim 1, further comprising a computer, wherein said control signal indicates said computer is entering a power-save mode, wherein said first hardwired driver based on said control signal turns off said first power to said first IDE device via said first switch, and wherein said computer operates said first IDE device when said computer is not entering said power-save mode.

3. The system of claim 2, further comprising an IDE controller for controlling operation of said first IDE device from said computer, wherein said first hardwired driver and said first switch are coupled between said computer and said IDE controller.

4. The system of claim 3, wherein said IDE controller comprises a plurality of channels for supporting concurrent operation of said first IDE device and a second IDE device from said computer.

5. The system of claim 2, wherein said control signal is sent from said computer to said input terminal and wherein said computer saves a context of an operation of said first IDE device prior to sending said control signal.

6. The system of claim 1, further comprising:
   a second power supply for supplying power at a second voltage;
   a second switch for receiving power supplied from said second power supply at said second voltage;
   a second damping resistor serially connected to said input terminal, said second damping resistor damping out any possible ringing on said control signal from said input terminal to prevent a false signaling effect;
   a second hardwired driver coupled to said second damping resistor and said second switch;
   a second IDE device coupled to said second power supply via said second switch;
   wherein said second IDE device operates at a different voltage level than said first IDE device; and
   wherein said second hardwired driver receives said control signal from said second damping resistor and drives said second switch to power said second IDE device via said second power.

7. The system of claim 1, further comprising:
   a second power supply for supplying power at a second voltage;
   a second switch for receiving power supplied from said second power supply at said second voltage;
   a second hardwired driver coupled to said first damping resistor and said second switch;
   a second IDE device coupled to said second power supply via said second switch;
   wherein said second IDE device operates at a different voltage level than said first IDE device; and
   wherein said second hardwired driver receives said control signal from said first damping resistor and drives said second switch to power said second IDE device via said second power.

8. The system of claim 1, wherein said first hardwired driver comprises a transistor.

9. The system of claims 8, wherein said transistor comprises a field effect transistor.

10. The system of claim 9, wherein said field effect transistor comprises a metal oxide field effect transistor.

11. The system of claim 8, wherein said transistor comprises an N-channel transistor.

12. The system of claim 8, where in said first switch comprises a second transistor.

13. The system of claim 1, wherein said first IDE device comprises one of a hard disk drive, a CD-ROM drive, and a tape drive.

14. An integrated hardwired driver electronics (IDE) device power control circuit, comprising:
   a first switch for receiving power supplied at a first voltage;
   a second switch for receiving power supplied at a second voltage;
   an input terminal for receiving a control signal;
   a damping resistor serially connected to said input terminal, said damping resistor damping out any possible ringing on said control signal from said input terminal;
   a first hardwired driver coupled to said damping resistor and said first switch; and
   a second hardwired driver coupled to said damping resistor and said second switch;
   wherein said first hardwired driver receives said control signal from said damping resistor and drives said first switch to power a first IDE device at said first voltage; and wherein said second hardwired driver receives said control signal from said damping resistor and drives said second switch to power a second IDE device at second voltage.

15. The system of claim 14, wherein said first hardwired driver comprises a first transistor and second hardwired driver comprises a second transistor.

16. The system of claim 15, wherein said first switch comprises a third transistor and second switch comprise a fourth transistor.

17. A method for controlling power, comprising:
supplying a power at a first voltage to a first IDE device via a first switch;
sending a first signal to an input terminal indicating a computer operating said first IDE device is entering a power-save mode;
damping out any possible ringing on said first signal via a first damping resistor serially connected to said input terminal;
receiving said damped control signal at a first hardwired driver from said first damping resistor;
generating from said first hardwired driver a second signal to turn off said power to said first IDE device; and
turning off said power to said first IDE device via said first switch.

18. The method of claim 17, further comprising:
determining if said computer has been idle for a predetermined time; and
toggling said first signal from said computer if said computer system has been idle for said predetermined time.

19. The method of claim 18, further comprising saving a context of an operation of said first IDE device by said computer to a memory prior to said computer entering said power-save mode.

20. The method of claim 17, further comprising:
supplying a second power at a second voltage to a second IDE device via a second switch;
sending said first signal to said input terminal indicating said computer operating said second IDE device is entering a power-save mode;
damping out any possible ringing on said first signal via a second damping resistor serially connected to said input terminal;
receiving said damped control signal at a second hardwired driver from said second damping resistor;
generating from said second hardwired driver a third signal to turn off said second power to said second IDE device; and
turning off said second power to said second IDE device via said second switch.

* * * * *